United States Patent
Nielsen et al.

(10) Patent No.: US 12,188,447 B2
(45) Date of Patent: Jan. 7, 2025

(54) CHAMFERED STRIP AND BEAM FOR A SPAR CAP OF A WIND TURBINE BLADE

(71) Applicant: Siemens Gamesa Renewable Energy A/S, Brande (DK)

(72) Inventors: Mogens Nielsen, Aalborg (DK); Wei Sun, Gistrup (DK)

(73) Assignee: Siemens Gamesa Renewable Energy A/S, Brande (DK)

( * ) Notice: Subject to any disclaimer, the term of this patent is extended or adjusted under 35 U.S.C. 154(b) by 0 days.

(21) Appl. No.: 18/283,907

(22) PCT Filed: Mar. 3, 2022

(86) PCT No.: PCT/EP2022/055367
§ 371 (c)(1),
(2) Date: Sep. 25, 2023

(87) PCT Pub. No.: WO2022/207225
PCT Pub. Date: Oct. 6, 2022

(65) Prior Publication Data
US 2024/0167451 A1   May 23, 2024

(30) Foreign Application Priority Data

Mar. 31, 2021 (EP) .................................... 21166192

(51) Int. Cl.
*F03D 1/06* (2006.01)
(52) U.S. Cl.
CPC .... *F03D 1/0681* (2023.08); *F05B 2280/6003* (2013.01)
(58) Field of Classification Search
CPC ...... F03D 1/065; F03D 1/0675; F03D 1/0681; F05B 2280/6003; F05B 2280/702
See application file for complete search history.

(56) References Cited

U.S. PATENT DOCUMENTS 10,232,528 B2 *   3/2019   Boon ...................... B29C 70/84
10,302,065 B2 *   5/2019   Smith ........................ B32B 5/26
(Continued)

FOREIGN PATENT DOCUMENTS

EP   3 019 741 A1   5/2016
EP   3 069 017 A1   9/2016
(Continued)

OTHER PUBLICATIONS

International Search Report & Written Opinion for PCT/EP2022/055367 issued on Jun. 10, 2022.

*Primary Examiner* — Sang K Kim
(74) *Attorney, Agent, or Firm* — Schmeiser, Olsen & Watts, LLP

(57) ABSTRACT

A strip for a spar cap is provided, wherein the strip is made from a composite material including a matrix and a reinforcement, and includes a first and second end region connected together in a longitudinal direction by an intermediate region having two mutually opposed longitudinally extending and parallelly disposed intermediate surfaces, wherein a thickness is determinable perpendicular to the two intermediate surfaces and a width is determinable perpendicular to the longitudinal direction and perpendicular to the thickness, wherein at least one of the first and the second end regions is a chamfered end region, wherein the at least one chamfered end region is simultaneously chamfered along the width and the thickness, wherein the at least one chamfered end region has a first edge at the intermediate region and a second edge at its free end, wherein the first edge and the second edge are substantially parallel to one another.

14 Claims, 6 Drawing Sheets

(56) References Cited

U.S. PATENT DOCUMENTS

2008/0145615 A1* 6/2008 Jacobsen .................. B32B 3/02
83/869
2014/0003956 A1* 1/2014 Lull ..................... B29C 70/865
416/230
2019/0309727 A1* 10/2019 Girolamo ............. B29C 70/302

FOREIGN PATENT DOCUMENTS

| EP | 3 549 752 A1 | 10/2019 |
| WO | 2015/003713 A1 | 1/2015 |
| WO | 2015/070876 A1 | 5/2015 |

* cited by examiner

CHAMFERED STRIP AND BEAM FOR A SPAR CAP OF A WIND TURBINE BLADE

CROSS-REFERENCE TO RELATED APPLICATIONS

This application claims priority to PCT Application No. PCT/EP2022/055367, having a filing date of Mar. 3, 2022, which claims priority to EP Application No. 21166192.1, having a filing date of Mar. 31, 2021, the entire contents both of which are hereby incorporated by reference.

FIELD OF TECHNOLOGY

The following is directed to a strip for a spar cap of a wind turbine blade, wherein the strip is made from a composite material. Further, the following is directed to a beam for the spar cap having two or more of these strips. Also, the following is directed to a spar cap having two or more of these beams and a wind turbine blade having one or more of these spar caps.

BACKGROUND

Wind turbine blades must be able to efficiently convert wind into a spinning movement of the wind turbine blades, so that the energy of the wind can be converted into rotary mechanical movement of a rotor to which the wind turbine blades are attached. Dimensions of wind turbines and wind blades are ever increasing, and consequently are increasing the challenges to overcome during the manufacturing processes of such wind turbine rotor blades.

In embodiments it may be preferable, to use materials having a high specific modulus (elastic modulus per mass density of a material), also known as stiffness to weight ratio, in wind turbine blades to deal with the square-cube law governing the scaling of wind turbine blades. Therefore, composite materials such as carbon fiber-reinforced plastic having a high specific modulus are commonly used in wind turbine blades.

Generally, strips made from composite material, such as carbon, may be applied in the manufacturing of a pre-casted spar cap so as to form a rectangular parallelepiped geometry. The strips are typically chamfered at both ends during manufacture to ensure a smooth thickness reduction and also a smooth stiffness transition to interfaces, which for example may be made from unidirectional glass plies and be provided at the end of beam. Without chamfering the strips at these locations, a significant shear stress transfer between different layers of strips in the spar cap may create cracks and delamination in-between the layers of strips and in between the strips and the interfaces, and eventually lead to a failure of the wind turbine blade.

FIG. 3 shows a perspective view on a portion of a spar cap 31 according to the conventional art. The upper illustration in FIG. 3 shows an exploded view of two beams 40.1, 40.2 joined on top of each other so as to form the spar cap 31 seen in the bottom illustration of FIG. 3.

An upper beam 40.1 of the two beams 40.1, 40.2 has three strips 50.1, 50.2, 50.3 made from a composite material and joined with each other along their longitudinal extension. Each of the strips 50.1, 50.2, 50.3 has a chamfered end region 51.1, 51.2, 51.3. These end regions 51.1, 51.2, 51.3 are located at free ends of the strips 50.1, 50.2, 50.3. The chamfer in these end regions 51.1, 51.2, 51.3 is provided along its thickness. A lower beam 40.2 of the two beams 40.1, 40.2 has the same chamfer design as the top beam 40.1.

The direction of the chamfer of the chamfered end regions 51.1 . . . 51.6 of the strips 50.1 . . . 50.6 is unified in the longitudinal direction of the spar cap 31. The chamfered end regions 51.1 . . . 51.6 of adjacent strips 50.1 . . . 50.6 start and end at respectively the same length position of the strips 50.1 . . . 50.6.

The design of the spar cap in the state of the art can only be changed in a very limited way to further improve the above-mentioned shear stress transfer and further optimize other areas for improvement, such as areas relating to design and mass of the spar cap, for example.

SUMMARY

An aspect relates to a spar cap and components thereof, in particular strips and beams, which provides improved stress distribution and design options at little manufacturing costs.

Features and details described in connection with the strip of embodiments of the invention apply in connection with the beam according to embodiments of the invention, the spar cap of embodiments of the invention, the wind turbine blade of embodiments of the invention and the method of embodiments of the invention as well as the other way around, so that regarding the disclosure of the individual aspects of embodiments of the invention it is or can be referred to one another.

According to a first aspect of embodiments of the invention, a strip for a spar cap of a wind turbine blade is provided. The strip is made from a composite material comprising a matrix and a reinforcement. The strip comprises a first end region and a second end region connected to one another in a longitudinal direction of the strip by an intermediate region. The intermediate region comprises two mutually opposed longitudinally extending and parallelly disposed intermediate surfaces. A thickness of the strip is determinable perpendicular to the two intermediate surfaces. A width of the strip is determinable perpendicular to the longitudinal direction of the strip and perpendicular to the thickness of the strip. At least one of the first and the second end regions is a chamfered end region, wherein the at least one chamfered end region starting from the intermediate region and extending in the longitudinal direction is simultaneously chamfered along the width and the thickness of the strip. The at least one chamfered end region has a first edge at the intermediate region and a second edge at its free end, wherein the first edge and the second edge are substantially parallel to one another.

In embodiments of the invention, the strip is chamfered or, in other words, tapered along its thickness and its width. Thereby, the strip according to the first aspect of embodiments of the invention provides for particularly good shear stress transfer in the spar cap and provides advantageous design possibilities due to the chamfer of the strip along the width and the thickness of the strip.

Due to the substantially parallel edges in the at least one chamfered end region, the strip with chamfer in the thickness and width directions of the strip may be manufactured very cost-effectively. The wording that the edges are substantially parallel to each other includes that the edges are parallel to each other as well as tolerances from an exact parallelism. A single cutting step may be used in order to cut the strip such that the edges located at the end of the strip are parallel with each other and the chamfer is provided in the width and thickness direction. Thereby, cost-intensive machining of geometrically complex end regions of the strip may be avoided. Embodiments of methods for manufacturing the strip of the first aspect of embodiments of the invention will be described later on in more detail.

The chamfer of the strip in the chamfered end region along the width means that the first edge and the second edge run transverse to the direction or extension of width of the strip. Thereby, when the first edge and the second edge run perpendicular to the longitudinal extension or together with the direction or extension of width of the strip, there is no chamfer of the strip along the width. Accordingly, the chamfer along the width of the strip may be seen when viewing the first edge and the second edge.

A width chamfer angle of the chamfer of the at least one chamfered end region is determinable or measurable between the first edge and the longitudinal direction or length of the strip. The width chamfer angle may be within the range of 10° to 80°, in particular within the range of 20° to 70° and more particularly within the range of 30° to 60°. The width chamfer angle is an angle of less than 90° because the chamfered end region is chamfered in width direction of the strip. Because the second edge is substantially parallel to the first edge, the second edge has substantially the same width chamfer angle as the first edge determinable between the second edge and the longitudinal direction of the strip.

A thickness chamfer angle of the chamfering of the at least one chamfered end region is determinable or measurable between a bottom intermediate surface of the intermediate surfaces and a chamfered surface of the chamfered edge region. The thickness chamfer angle may be in the range of 0.2° to 5°, in particular in the range of 0.4° to 3° and moreover in particular in the range of 0.6° to 2°. The first chamfered surface is the top surface having the chamfer or tapering along the thickness of the strip. The bottom intermediate surface is the one of the two intermediate surfaces which is opposite to the chamfered surface because the chamfered end region is chamfered at the top but not at the bottom. The chamfered surface on the other hand is adjacent to the top intermediate surface opposite to the bottom intermediate surface. The chamfered surface and the top intermediate surface share the first edge with each other or, in other words, are separated from one another by the first edge.

The reinforcement of the composite material may comprise unidirectional fibers arranged in the longitudinal direction of the beam. In particular, the reinforcement of the composite material may be a plurality of unidirectional fibers.

The composite material may be a fiber-reinforced plastic, in particular a carbon fiber-reinforced plastic. Fiber-reinforced plastics, in particular carbon fiber-reinforced plastics, have a particularly high stiffness-to-weight ratio and, in embodiments, may be used where high loads are applied to the strip and thereby to the spar cap in which they are used. Further or alternative fiber-reinforced plastics for use in the strip may be glass fiber-reinforced plastic and aramid fiber-reinforced plastic, for example. In a carbon fiber-reinforced plastic, carbon fibers are the reinforcement and a polymer resin, such as epoxy, is the matrix. A carbon fiber-reinforced plastic may comprise further fibers such as glass fibers or aramid fibers as reinforcement. However, in embodiments the carbon fiber-reinforced plastic may comprise predominantly carbon fibers as reinforcement. Alternatively, as the composite material of the strip, composite wood, ceramic matrix composite or a metal matrix composite may be used.

The strip may be a pultruded part or profile. Such pultruded strips may be employed in a particularly cost-efficient manner in the manufacturing of the spar caps for the wind turbine blades. It has been found that the machining of pultruded strips for the manufacture of spar caps including the above-mentioned single step of cutting may be implemented in a very cost-efficient manner.

According to a second aspect of embodiments of the invention, the above-mentioned problem is solved by a beam for a spar cap of a wind turbine blade. The beam comprises at least two strips according to the first aspect of embodiments of the invention. The strips are joined to each other such that they extend in parallel along a common longitudinal direction of the strips and the beam.

The joining of the strips with each other such that they extend in parallel along a common longitudinal direction of the strips and the beam may be done by adhesion. For example, the joint of the strips may be established by resin molding. The joined strips may be arranged adjacent to one another. The strips may be located in a common plane of the beam. The advantageous chamfered end regions provide for several design possibilities with respect to arrangement of the strips in the beam.

Different numbers of strips may be employed in the beam. For example, two, three, four, five or more strips may be used. The width of the intermediate regions of the individual strips in the beam may vary or be the same for all of the strips in the beam. In embodiments, the length and thickness of the intermediate regions of the strips may be the same for all of the strips in the beam.

The at least two strips may be located at outer longitudinal sides of the beam. Their chamfered end regions may be chamfered towards each other along their width and in the common longitudinal direction. In other words, the first edges and second edges of the chamfered end regions of the at least two strips may be extending towards each other in the common longitudinal direction. Such a design may also be referred to as a double side chamfer design. In embodiments, the design may be particularly advantageous with respect to mitigating the risk of failure of the beam due to fatigue. This is achieved by the width chamfering of the chamfered end regions, whereby transverse wrinkles in the beam are avoided.

The double side chamfering design enables variation of the width of the beam and thereby the spar cap in the longitudinal direction or, speaking in terms of the wind turbine blade, the spanwise direction of the wind turbine blade. Accordingly, the width of the beam may decrease in the longitudinal direction towards its free end. Accordingly, the beam may be positioned as close to the tip of the wind turbine blade as possible. Further, the overall blade mass and mass moment may be lowered and consequently the costs of the wind turbine blade may be decreased.

At least two of the chamfered end regions of the strips in the beam may be different from one another. In particular, the chamfered end regions being different from one another may have different width chamfer angles and/or starting positions of the chamfer along the length of the strips or, in other words, have their first edges provided at different length positions of the strips. Accordingly, the chamfered end regions of the strips are thereby distributed asymmetrically with respect to a center line of the beam extending in the longitudinal direction. Such asymmetric design may be used to improve the load characteristics of the wind turbine blade at the trailing edge or leading edge, for example, by accordingly distributing the overall chamfer towards the trailing edge or leading edge.

The first edges of the strips may be connected to each other forming a common first edge and the second edges of the strips may be connected to each other forming a common second edge. Thereby, an integral design of the beam is provided without having any possibly detrimental design aspects. The first edges and second edges may be aligned in a straight line with each other or connected together as such that a corner is formed between the edges.

At least one further strip may be disposed in between the at least two strips according to the first aspect of embodiments of the invention, wherein that further strip is not chamfered along its width. Accordingly, the further strip may only be chamfered along its length. The thickness chamfer angle of the further strip may be the same as the one of the two strips according to embodiments of the first aspect of the invention.

According to a third aspect of embodiments of the invention, embodiments of the invention provide a spar cap for a wind turbine blade, the spar cap having at least two beams according to the second aspect of embodiments of the invention stacked on top of one another as layers of the spar cap.

The different beams or layers of the spar cap may be adhesively joined to each other. For example, resin molding may be used for joining them with each other. The number of beams or layers stacked on top of each other may be in the range of 2 to 12, for example.

According to a fourth aspect of embodiments of the invention, embodiments provide a wind turbine blade of a wind turbine, the wind turbine blade comprising a shell and a spar having at least one spar cap according to the third aspect of embodiments of the invention.

The spar cap according to the third aspect of embodiments of the invention may be located at different locations of the wind turbine blade. For example, such a spar cap may be located in the main spar but alternatively or additionally may also be located at the trailing edge or at any other spar location of the wind turbine blade.

According to a fifth aspect of embodiments of the invention, embodiments provide a method for machining a strip according to the first aspect of embodiments of the invention. In embodiments, the method comprises the step of machining the at least one chamfered end region in the strip. The machining is performed by cutting off a portion from the at least one chamfered end region in the strip in a single cutting step such that the at least one chamfered end region is machined.

For the cutting step, any simple cutting tool such as a blade may be used. The cutting tool may be oriented relative to the strip such that the width chamfer angle and the thickness chamfer angle are machined into the strip when the cutting tool is guided through the strip. Because it is sufficient to perform only a single cutting step to machine the chamfered end region having the chamfer along width and thickness, the machining and consecutive layup of the strips for the beam and the spar caps can be done very efficiently. In embodiments, the method provides for an effective yet cost-efficient production of wind turbine blades.

BRIEF DESCRIPTION

Some of the embodiments will be described in detail, with reference to the following figures, wherein like designations denote like members, wherein.

DETAILED DESCRIPTION

Same objects in FIGS. 1 to 9 are denominated with the same reference number. If there is more than one object of the same kind in one of the figures, the objects are numbered in ascending order with the ascending number of the object being separated from its reference number by a dot.

Figure 1:
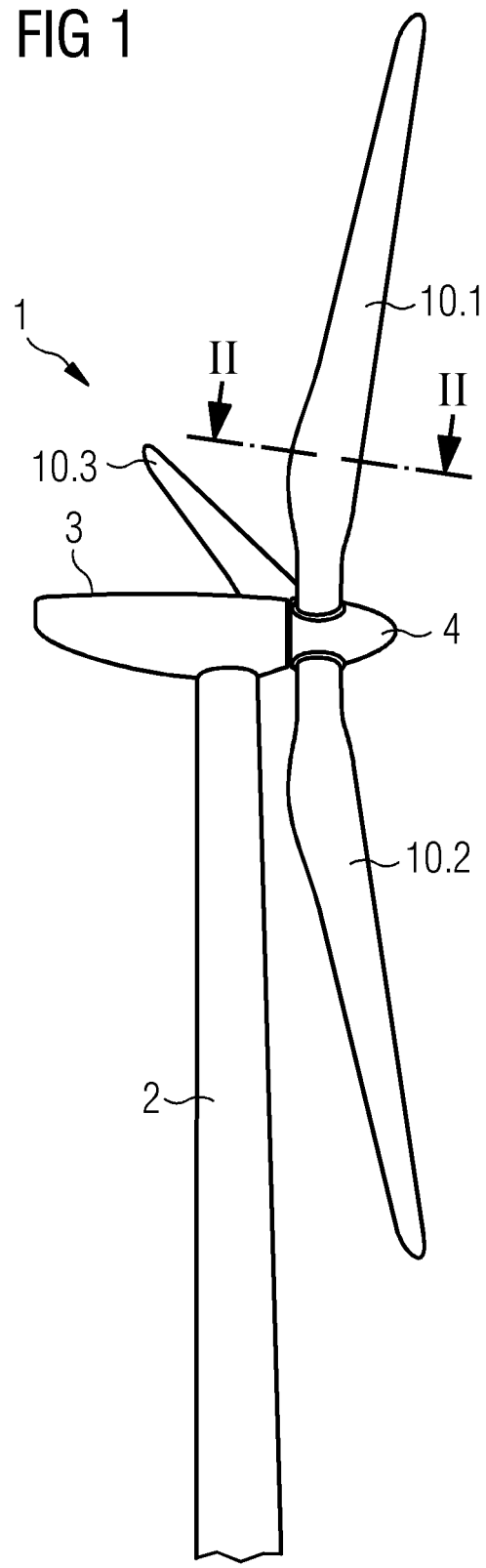
FIG. 1 shows a side view of an embodiment of a wind turbine according to embodiments of the invention.

FIG. 1 is a side view of an embodiment of a wind turbine 1 according to embodiments of the invention. The wind turbine 1 is provided with three wind turbine blades 10.1, 10.2, 10.3 attached to a hub 4 of the wind turbine 1, which is connected to a nacelle 3 of the wind turbine 1, the nacelle 3 being supported on a mast 2 of the wind turbine 1.

Figure 2:
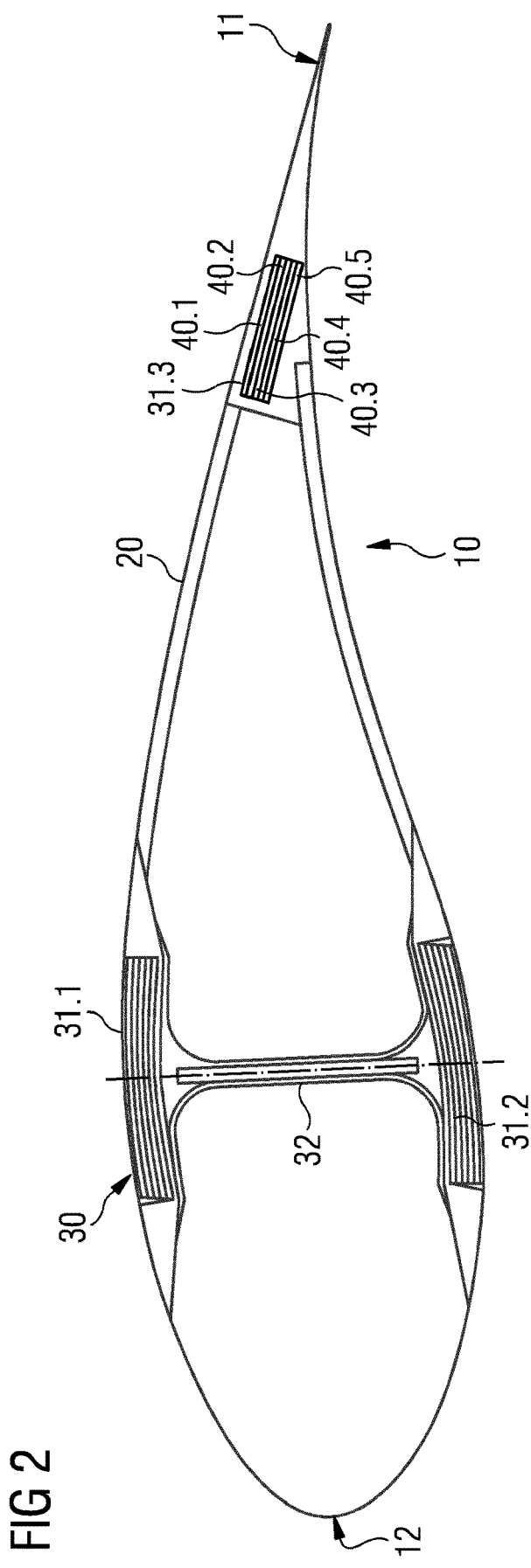
FIG. 2 shows a sectional view along a transversal plane of an embodiment of a wind turbine blade of the wind turbine of FIG. 1.

FIG. 2 is a sectional view along the transversal plane of line II-II depicted in FIG. 1 of the wind turbine blade 10.1 of the wind turbine 1 of FIG. 1. The wind turbine blade 10 has a trailing edge 11 and a leading edge 12. The wind turbine blade 10.1 comprises a shell 20 and a spar 30. The spar 30 comprises three spar caps 31.1, 31.2, 31.3. The two spar caps 31.1, 31.2 face each other and are connected to one another by a spar web 32. The spar caps 31.1, 31.2 form the main spar of the wind turbine blade 10. The spar cap 31.3 is arranged at the trailing edge 11 of the wind turbine blade 10.

The described design of the wind turbine blade 10 is only exemplary and other designs may benefit from the strips 50 and beams 40 as proposed by embodiments of the invention. In particular, the spar caps 31 manufactured using the strips 50 and beams 40 as described herein may be located at any suitable location of spar caps 31 in such wind turbine blade 10.

In the exemplary drawing of FIG. 2, the spar cap 31.3 comprises four beams 40.1, 40.2, 40.3, 40.4 stacked on top of one another. However, any number of beams 40 can be provided in any of the spar caps 31.1, 31.2, 31.3.

Each of the beams 40 employed in the wind turbine blades 10.1, 10.2, 10.3 may be made up of several strips 50 located adjacent to each other as will be explained with reference to the following drawings. Each one of these strips 50 is made from a composite material. The number of beams 40 and strips 50 provided in the following embodiments of the invention is only chosen according to one example and may be amended to any other suitable number. For example, the number of beams 40 in a spar cap 31 may be 2 to 12 and the number of adjacent strips 50 may be 2 to 8, for example.

Figure 3:
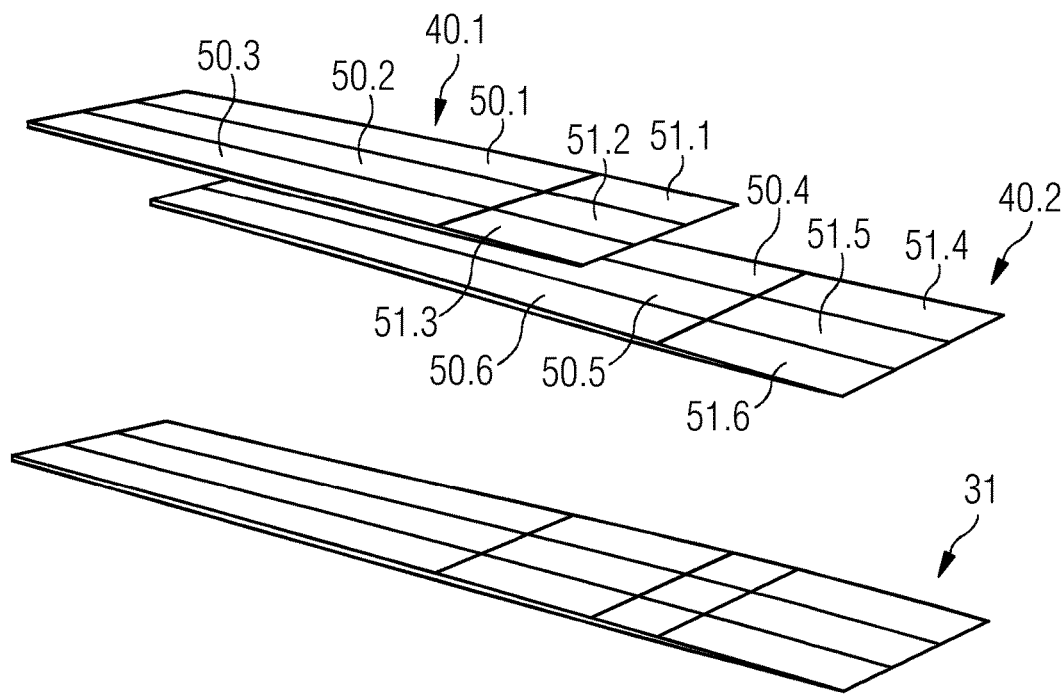
FIG. 3 shows a side perspective view of a spar cap according to the conventional art.

FIG. 3 shows a perspective view of a portion of a spar cap 31 according to the conventional art. The upper illustration in FIG. 3 shows an exploded view of two beams 40.1, 40.2 joined on top of each other so as to form the spar cap 31 seen in the bottom illustration of FIG. 3.

A top beam 40.1 of the two beams 40.1, 40.2 has three strips 50.1, 50.2, 50.3 made from a composite material and joined with each other along their longitudinal extension.

Each of the strips 50.1, 50.2, 50.3 has a chamfered end region 51.1, 51.2, 51.3. These end regions 51.1, 51.2, 51.3 are located at free ends of the strips 50.1, 50.2, 50.3. The chamfer in these end regions 51.1, 51.2, 51.3 is provided along its thickness. A bottom beam 40.2 of the two beams 40.1, 40.2 has the same chamfer design as the top beam 40.1.

The direction of the chamfer of the chamfered end regions 51.1 ... 51.6 of the strips 50.1 ... 50.6 is unified in the longitudinal direction of the spar cap 31. The chamfered end regions 51.1 ... 51.6 of adjacent strips 50.1 ... 50.6 start and end at respectively the same length position of the strips 50.1 ... 50.6.

Figure 4:
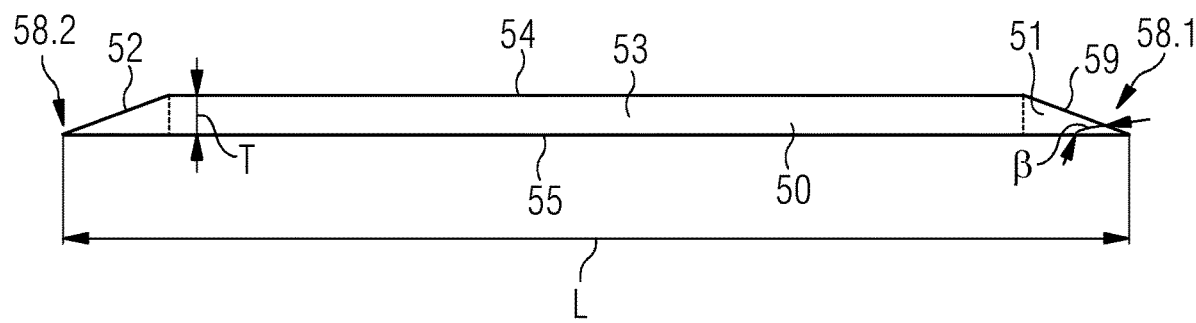
FIG. 4 shows a side view of a strip for a spar cap of the wind turbine blade of FIG. 2.

FIG. 4 is a side view on a strip 50 for one of the spar caps 31 in the wind turbine blade 10 of FIG. 1. This strip 50 is designed according to embodiments of the invention and is further illustrated in FIG. 5.

The strip 50 has an intermediate region 53 and two longitudinally opposed end regions 51, 52 being separated from one another by the intermediate region 53. The end regions 51, 52 are chamfered in a longitudinal direction D (see FIG. 5) measurable along the length L of the strip 50.

The intermediate region 53 has two mutually opposed intermediate surfaces 54, 55. The intermediate surfaces 54, 55 extend longitudinally in the longitudinal direction D. The intermediate surfaces 54, 55 are disposed parallel to each other. The intermediate surfaces 54, 55 may be generally planar. The term generally planar includes planar and deviations from planar surfaces depending on the material of the intermediate region 53 and/or the manufacturing process by which it is manufactured. A thickness T of the strip 50 is determinable or measurable between the intermediate surfaces 54, 55 and perpendicular to the intermediate surfaces 54, 55.

The end regions 51, 52 are chamfered or, in other words, tapered in the longitudinal direction D following the length L of the strip 50. Accordingly, the end regions 51, 52 may also be referred to as chamfered or tapered end regions 51, 52. A thickness chamfer angle β of the chamfered end regions 51, 52 in the longitudinal direction (depicted only for the chamfered end region 51 but also applicable to the chamfered end region 52 with the same or a different thickness chamfer angle β) is determinable or measurable between the bottom intermediate surface 55 and the chamfered surface 59 of the chamfered end region 51. The chamfered surface 59 is the top surface of the chamfered end region 51. The bottom intermediate surface 55 is the one of the intermediate surfaces 54, 55 which is opposed to the top intermediate surface 54 of the intermediate surfaces 54, 55 and the chamfered surface 59. The bottom intermediate surface 55 extends away from the intermediate region 53 towards and with the chamfered end regions 51, 52 as the strip 50 is not chamfered on the bottom side thereof but only on the top side as seen in FIG. 4. Accordingly, the chamfered end regions 51, 52 have the bottom intermediate surface 55 as common, in particular planar, surface.

In other words, the chamfered end regions 51, 52 are tapered or chamfered such that the thickness T of the end regions 51, 52 decreases along its length L towards free ends 58.1, 58.2 of the end regions 51, 52. The thickness T tapers with the second chamfer angle β.

Figure 5:
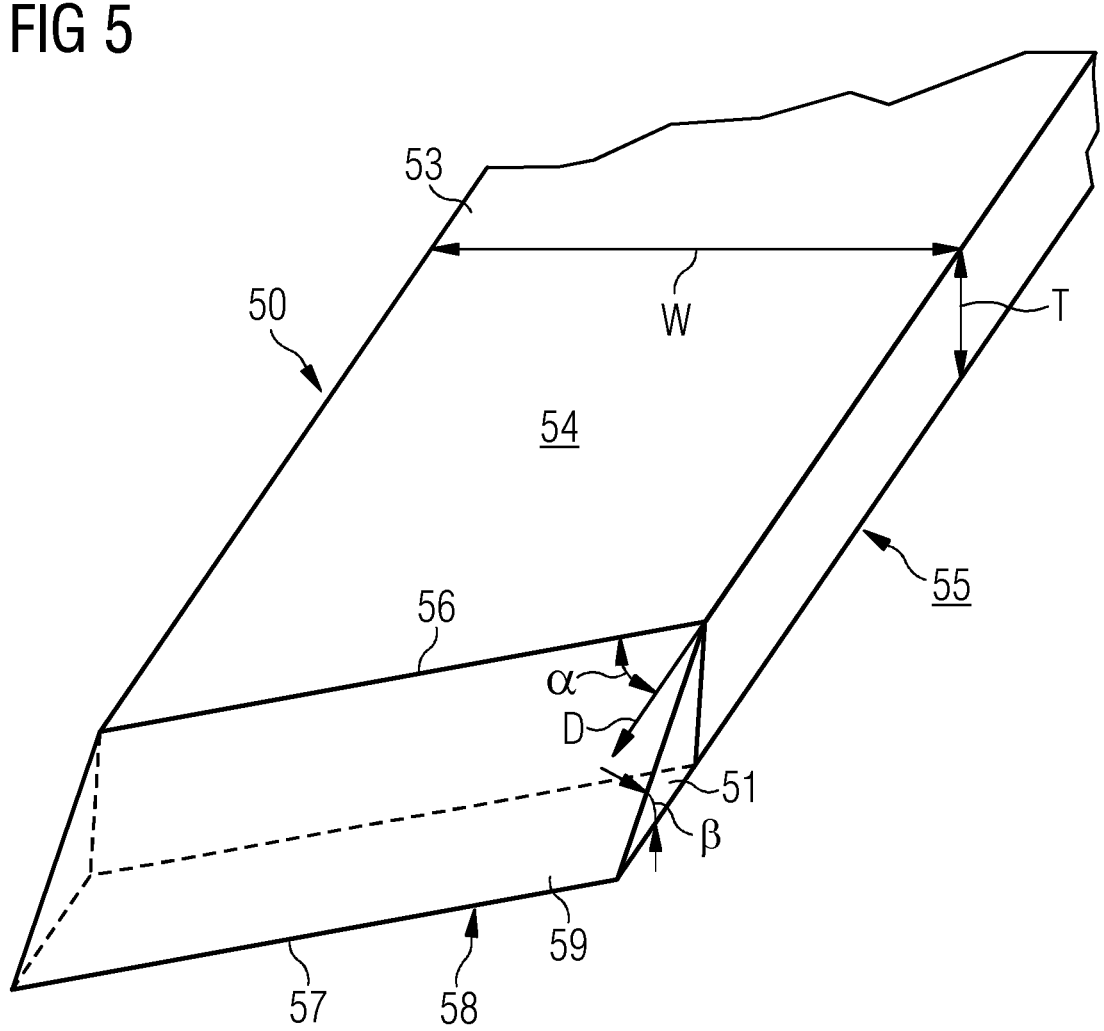
FIG. 5 shows a side perspective view of a portion of the strip of FIG. 4 for use in a spar cap according to FIG. 2.

FIG. 5 shows a side perspective view on a portion of the strip 50 of FIG. 4. The portion of the strip 50 having the chamfered end region 52 is not depicted but may be designed equally with respect to the design and/or dimensions, in particular chamfer angles α and β, to the chamfered end region 51 seen in FIG. 5.

From FIG. 5 it may be taken that the strip 50 is not only chamfered along its thickness T with the thickness chamfer angle β in its chamfered end region 51 but that the chamfered end region 51 is as well or simultaneously chamfered or tapered along the width W of the strip 50 with a width chamfer angle α. The width W of the strip 50 is measurable perpendicular to the thickness T and perpendicular to the length L or the longitudinal direction D, along which the length L of the strip 50 is measurable.

The width chamfer angle α is measurable or determinable between a first edge 56 and the longitudinal direction D. The width chamfer angle α is different from 90°, in particular less than 90°, as it provides a chamfer. It may be within the range of 30° to 60°, for example.

The first edge 56 is an edge between the intermediate region 53 and the chamfered end region 51. The chamfer or taper of the chamfered end region 51 starts from the first edge 56. The chamfered end region 51 ends at a second edge 57 located at one of two free ends 58 of the strip 50. The second edge 57 is substantially parallel to the first edge 56.

Due to the edges 56, 57 being substantially parallel to one another, the chamfered end region 51 may be manufactured by one single step of cutting away a piece of the strip 50 at the chamfered end region 51. Complex and expensive machining is avoided and such machining of the strip 51 can be employed with little effort into consequent manufacturing of the beam 40 and spar cap 31.

FIGS. 6 to 9 show different embodiments of portions of beams 40.1, 40.2 and portions of spar caps 31 according to embodiments of the invention, which are manufacturable by using multiples of the strip 50 of FIGS. 4 and 5. The beams 40.1, 40.2 and the spar caps 31 are shown only in portion with one end, whereas the other end may be designed similar in shape and/or dimension.

FIGS. 6 to 9 employ strips 50 according to FIGS. 4 and 5. However, the illustrations in FIGS. 6 to 9 are a schematic representation of the beams 40.1, 40.2 and the spar caps 31. Due to the small thickness chamfer angles β employed in the chamfer end regions 51, the chamfering may not be particularly visible from FIGS. 6 to 9. Accordingly, reference is made to the drawings FIGS. 4 and 5 with regard to the thickness chamfers, which are exaggerated for illustration purposes in FIGS. 4 and 5.

In each one of the spar caps 31 of FIGS. 6 to 9, two beams 40.1, 40.2 are employed. However, depending on the thickness T of the strips 50 and the required thickness of the spar cap 31, more or less than two beams 40.1, 40.2 may be used to manufacture the spar cap 31. Also, in FIGS. 6 to 9, three strips 50 are being employed for each one of the beams 40.1, 40.2. However, the number of strips 50 may be amended to two, four or more depending on the width W of the strips 50 and the required width of the spar cap 31.

Figure 6:
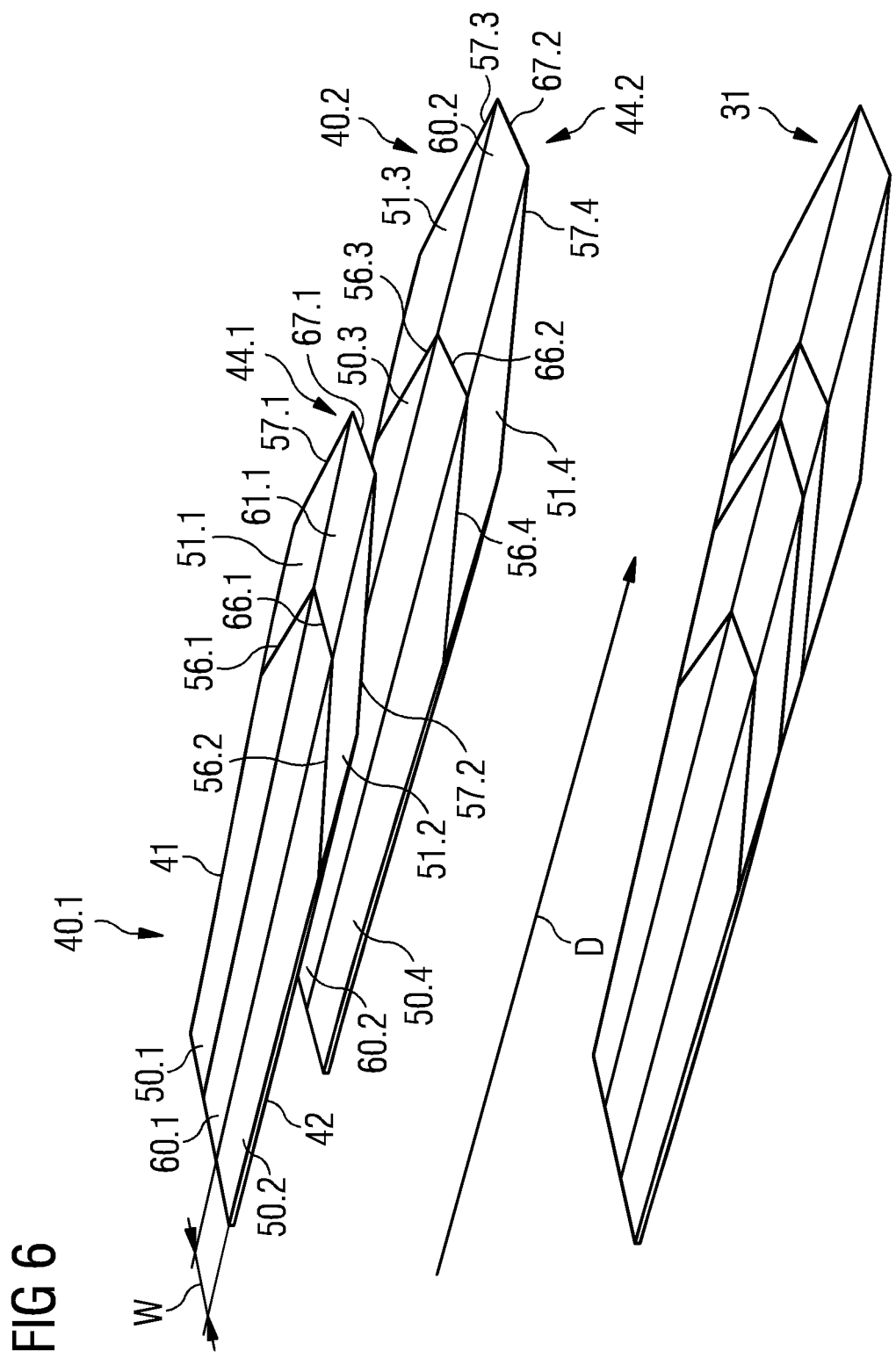
FIG. 6 shows a schematic representation of a portion of a spar cap according to an embodiment of the invention.

The beam 40.1 in FIG. 6 makes use of two strips 50.1, 50.2 designed according to FIG. 5. A further strip 60.1 is placed in between the two strips 50.1, 50.2. The two strips 50.1, 50.2 are located at outer longitudinal sides 41, 42 of the beam 40.1 or, in other words, the strips 50.1, 50.2 form the longitudinal sides 41, 42 of the beam 40.1. Further strip 60.1 may be made from the same material as the strips 50.1, 50.2. The strips 50.1, 50.2, 60.2 are joined adjacent to each other along their length.

The chamfered end regions 51.1, 51.2 are simultaneously chamfered in the direction of the width W und the thickness T of the strips 50.1, 50.2. However, the chamfering is provided such that the chamfered end regions 51.1, 51.2 are chamfered towards each other. In other words, the first edges 56.1, 56.2 are extending towards each other along the length L or the common longitudinal direction D of the strips 50.1, 50.2, 60.1.

The further strip 60.1 is an intermediate strip 60.1 not having a chamfer along the width W of that strip 60.1. This may be seen from the first edge 66.1 and second edge 67.1 of that further strip 60.1, which runs perpendicular to the common longitudinal direction D.

The further strip 60.1 has a chamfer along its thickness T. The thickness chamfer angle β of the further strip 60.1 may be the same as the thickness chamfer angles β of the strips 50.1, 50.2. In other words, the chamfer or taper along the thickness T of the strips 50.1, 50.2, 60.1 is the same for all of them.

The first edges 56.1, 66.1, 56.2 are connected to each other so as to form a common first edge of the beam 40.1. Also, the second edges 56.1, 66.2, 56.2 are connected to each other so as to form a common second edge of the beam 40.1.

The beam 40.2 is designed just like the beam 40.1 but has a greater length L extending in the common longitudinal direction D. The beam 40.1 is placed on top of the beam 40.2 and thereafter the beams 40.1, 40.2 are joined with each other, for example by resin molding. Thereby, the spar cap 31 seen in the lower portion of FIG. 6 is obtained.

Both beams 40.1, 40.2 are tapered at their free ends 44.1, 44.2 due to the width chamfer of the respective strips 50.1, 50.2, 50.3, 50.4 in their chamfered end regions 51.1, 51.2, 51.3, 51.4.

Figure 7:
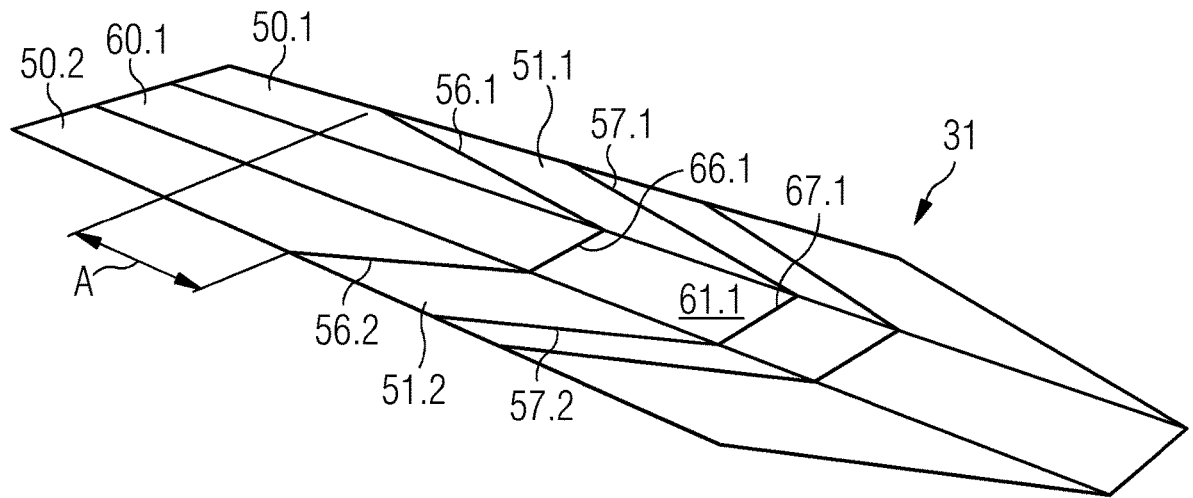
FIG. 7 shows a schematic representation of a portion of a spar cap according to a further embodiment of the invention.

FIG. 7 shows a spar cap 31 similar to the one of FIG. 6 but with a slight amendment with respect to the outer strips 50.1, 50.2 used in the beam 40.1 (and in the beam 40.2 beneath it).

The strip 50.1 has a chamfered end region 51.1 starting at a position of length L of the strip 50.1 before the chamfered end region 51.3 of the strip 50.3 starts. The length difference of the positions of length L at which the chamfered end regions 51.1, 51.2 respectively start is indicated by an A.

Also, the width chamfer angle α of the strip 50.1 is smaller than the width chamfer angle α of the strip 50.2. Such asymmetric design of the overall chamfered end regions 51.1, 61.1, 51.2 may be used to provide different characteristics for particular locations of spar caps 31 in the wind turbine blade 10.

Figure 8:
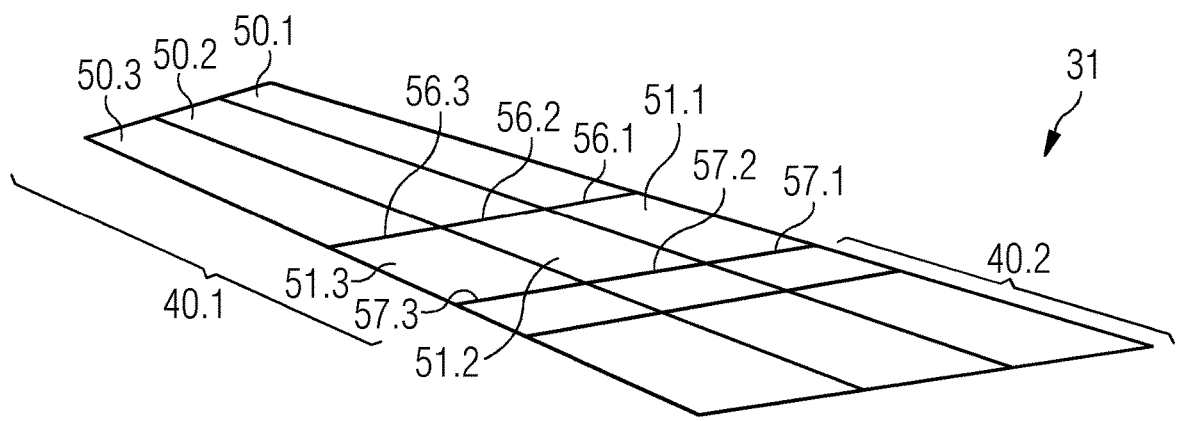
FIG. 8 shows a schematic representation of a portion of a spar cap according to a still further embodiment of the invention.

FIG. 8 shows a further example of an asymmetric design of a spar cap 31 with respect to the chamfered end regions 51.1, 51.2, 51.3. The first edges 56.1, 56.2, 56.3 are lined up so as to form a common first edge along a straight line. Also, the second edges 57.1, 57.2, 57.3 are lined up so as to form a common second edge along a straight line. To achieve this, the strips 50.1, 50.2, 50.3 are provided with the same width chamfer angle α but the chamfered end regions 51.1, 51.2, 51.3 start at different positions of length L of the strips 50.1, 50.2, 50.3 such that the first edges 56.1, 56.2, 56.3 and the second edges 57.1, 57.2, 57.3 are aligned with each other.

Figure 9:
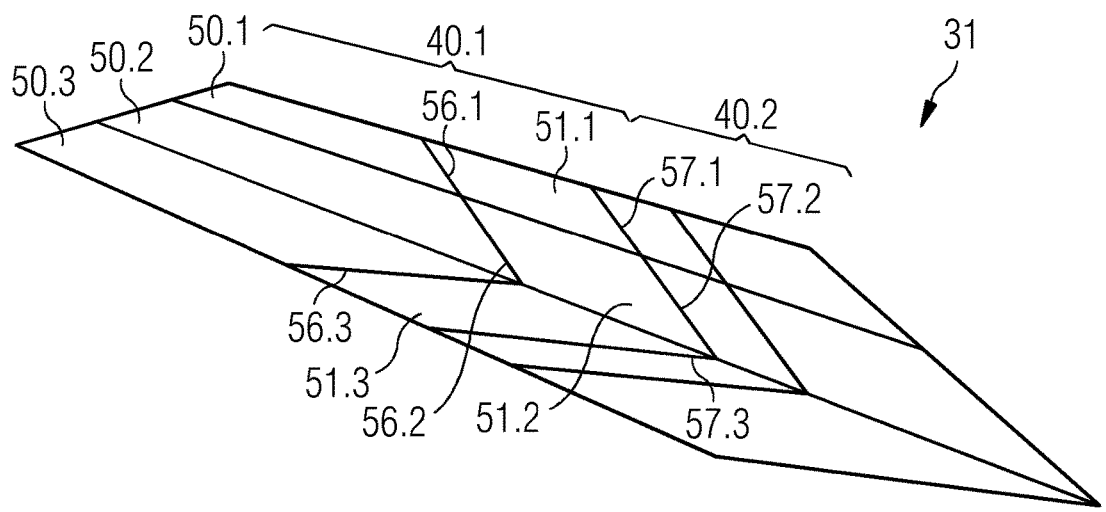
FIG. 9 shows a schematic representation of a portion of a spar cap according to a yet further embodiment of the invention.

FIG. 9 shows a further example of an asymmetric design of a spar cap 31 with respect to the chamfered end regions 51.1, 51.2, 51.3. In this design of the spar cap 31, the beams 40.1, 40.2 are once again designed the same with respect to the chamfered end regions 51.1, 51.2, 51.3 but they have different lengths L. As in FIG. 8, three strips 50.1, 50.2, 50.3 are designed with chamfer along width W and thickness T. However, they are designed to form a common first edge and a common second edge having a V-shape.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A strip for a spar cap of a wind turbine blade, wherein the strip is made from a composite material comprising a matrix and a reinforcement,
   wherein the strip comprises a first end region and a second end region connected to one another in a longitudinal direction of the strip by an intermediate region, wherein the intermediate region comprises two mutually opposed longitudinally extending and parallelly disposed intermediate surfaces, wherein a thickness of the strip is determinable perpendicular to the two intermediate surfaces and a width of the strip is determinable perpendicular to the longitudinal direction of the strip and perpendicular to the thickness of the strip,
   wherein the strip is chamfered in at least one of the first and the second end regions, wherein in the at least one chamfered end region the strip is simultaneously chamfered along the width and the thickness in the longitudinal direction,
   wherein the at least one chamfered end region has a first edge at the intermediate region and a second edge at its free end, wherein the first edge and the second edge are substantially parallel to one another,
   wherein a width chamfer angle is determinable between the first edge of the strip and the longitudinal direction D, and wherein the width chamfer angle is different from 90°.

2. The strip according to claim 1, wherein width chamfer angle of the chamfer of the at least one chamfered end region determinable between the first edge and the longitudinal direction is within the range of 30° to 60°.

3. The strip according to claim 1, wherein a thickness chamfer angle of the chamfer of the at least one chamfered end region determinable between a bottom intermediate surface of the intermediate surfaces and a chamfered surface of the chamfered end region is in the range of 0.2° to 5°.

4. The strip according to claim 1, wherein the reinforcement of the composite material comprises unidirectional fibers arranged in the longitudinal direction of the strip.

5. The strip according to claim 1, wherein the composite material is a fiber-reinforced plastic.

6. The strip according to claim 1, wherein the strip is a pultruded part.

7. A beam for a spar cap of a wind turbine blade, the beam comprising at least two strips according to claim 1, the strips being joined to each other such that they extend in parallel along a common longitudinal direction of the strips and the beam.

8. The beam according to claim 7, wherein the at least two strips are located at outer longitudinal sides of the beam and their chamfered end regions are chamfered towards each other along their width and in the common longitudinal direction.

9. The beam according to claim 8, wherein the width of the beam decreases in the longitudinal direction towards its free end.

10. The beam according to claim 8, wherein at least two of the chamfered end regions of the strips are different from one another.

11. The beam according claim 7, wherein the first edges of the strips are connected to each other forming a common first edge and the second edges of the strips are connected to each other forming a common second edge.

12. The beam according to claim 7, wherein at least one further strip is disposed in between the at least two strips, wherein that further strip is not chamfered along its width.

13. A spar cap for a wind turbine blade, the spar cap having at least two beams according to claim 7 stacked on top of one another as layers of the spar cap.

14. A method for machining a strip according to claim 1, wherein the method comprises cutting off a portion from the at least one chamfered end region in the strip in a single cutting step such that the at least one chamfered end region is machined.

* * * * *